(No Model.) 6 Sheets—Sheet 1.
G. W. DICKIE.
APPARATUS FOR DRAINING MINES.
No. 294,859. Patented Mar. 11, 1884.
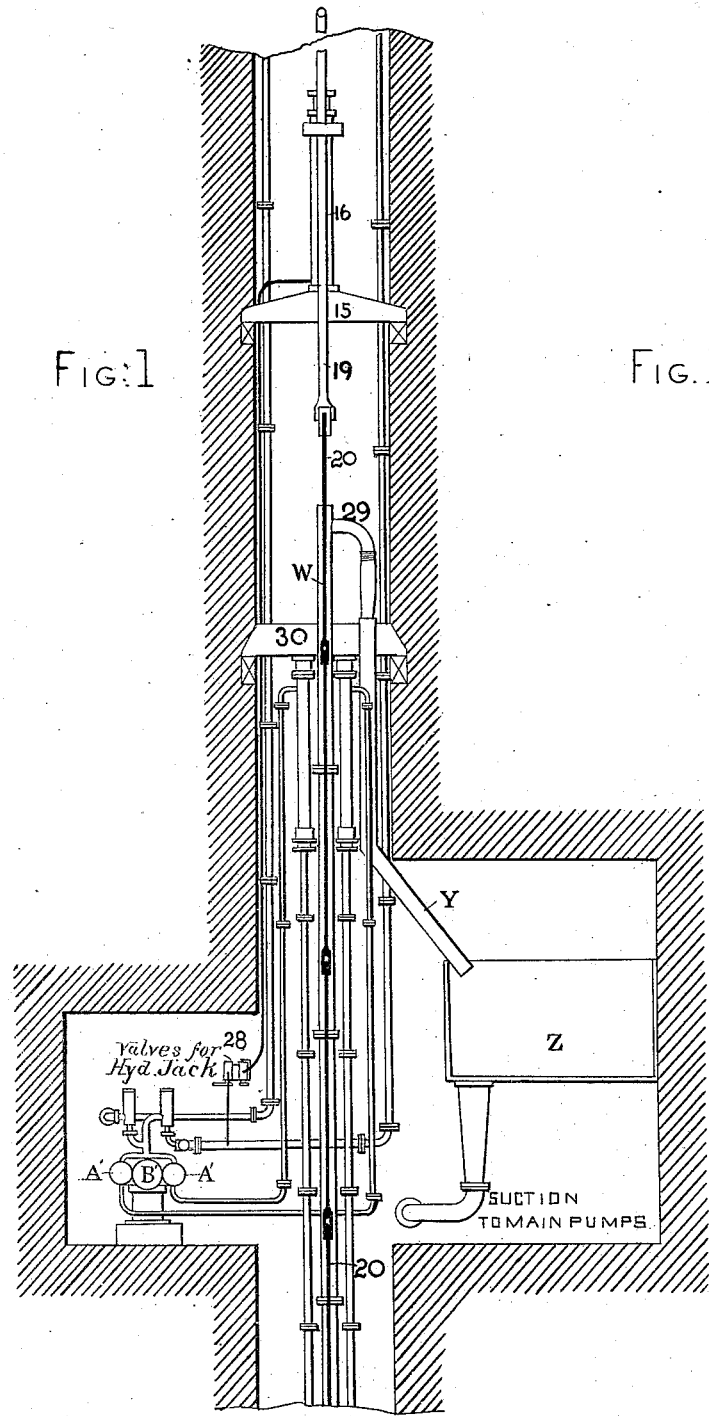
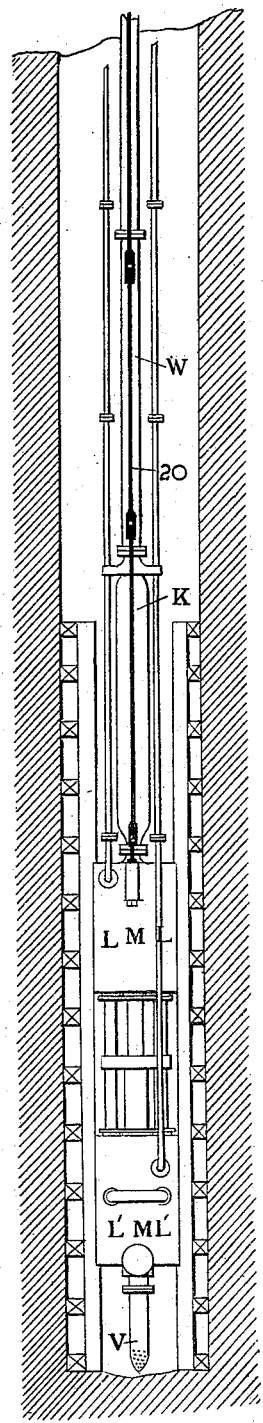
Witnesses
Thomas Barclay
A. B. Bowers
Inventor
George W. Dickie
by George Pardy, Atty

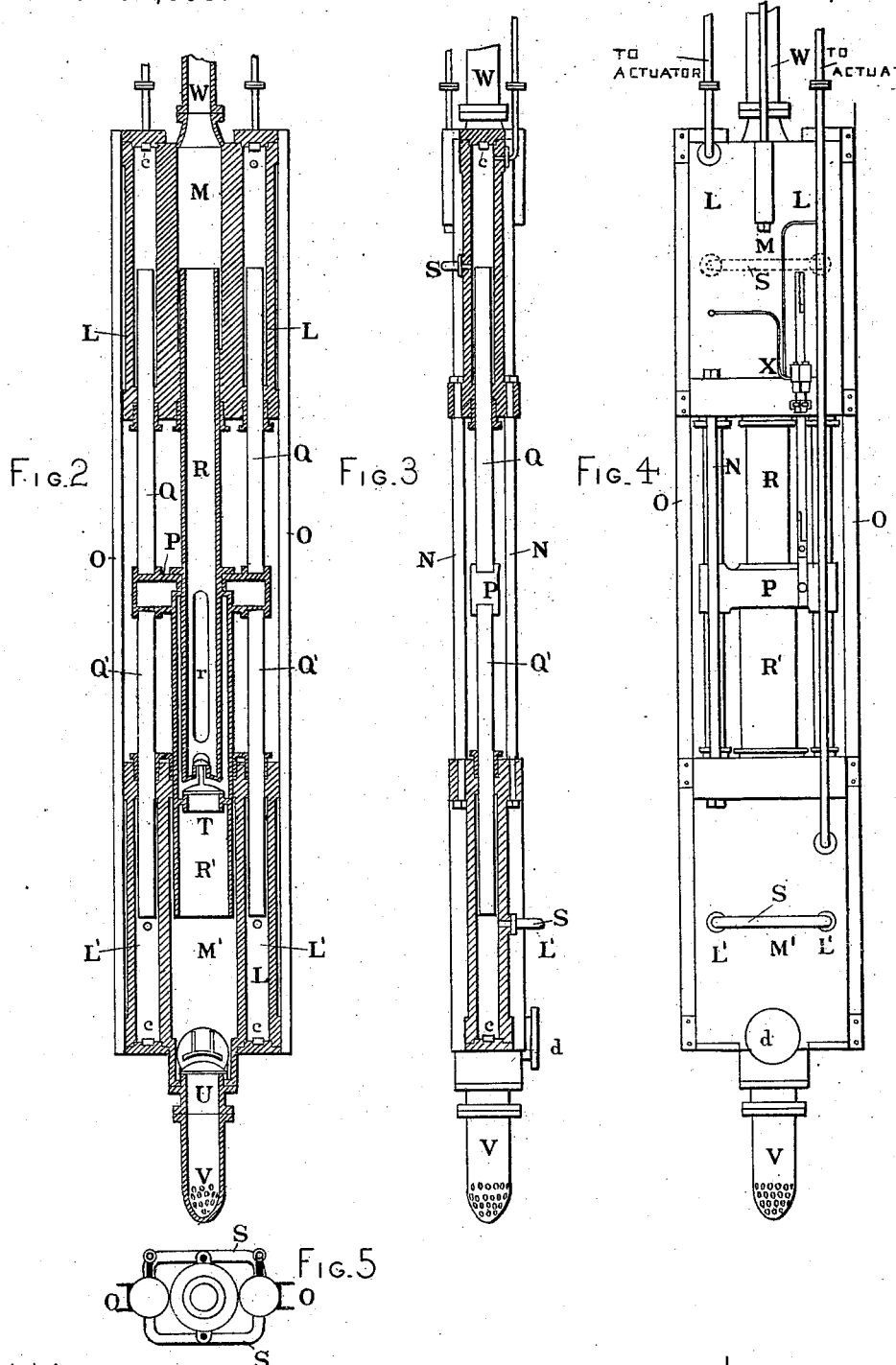

(No Model.) 6 Sheets—Sheet 3.
G. W. DICKIE.
APPARATUS FOR DRAINING MINES.
No. 294,859. Patented Mar. 11, 1884.
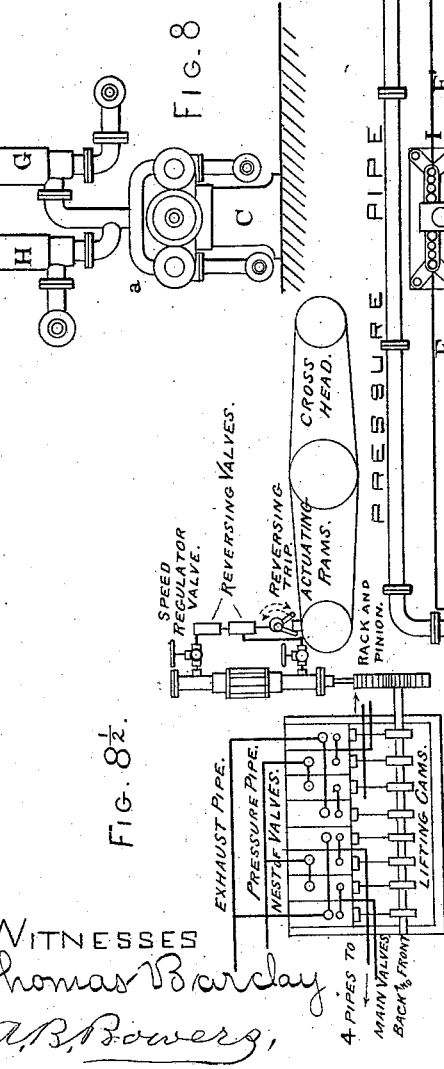
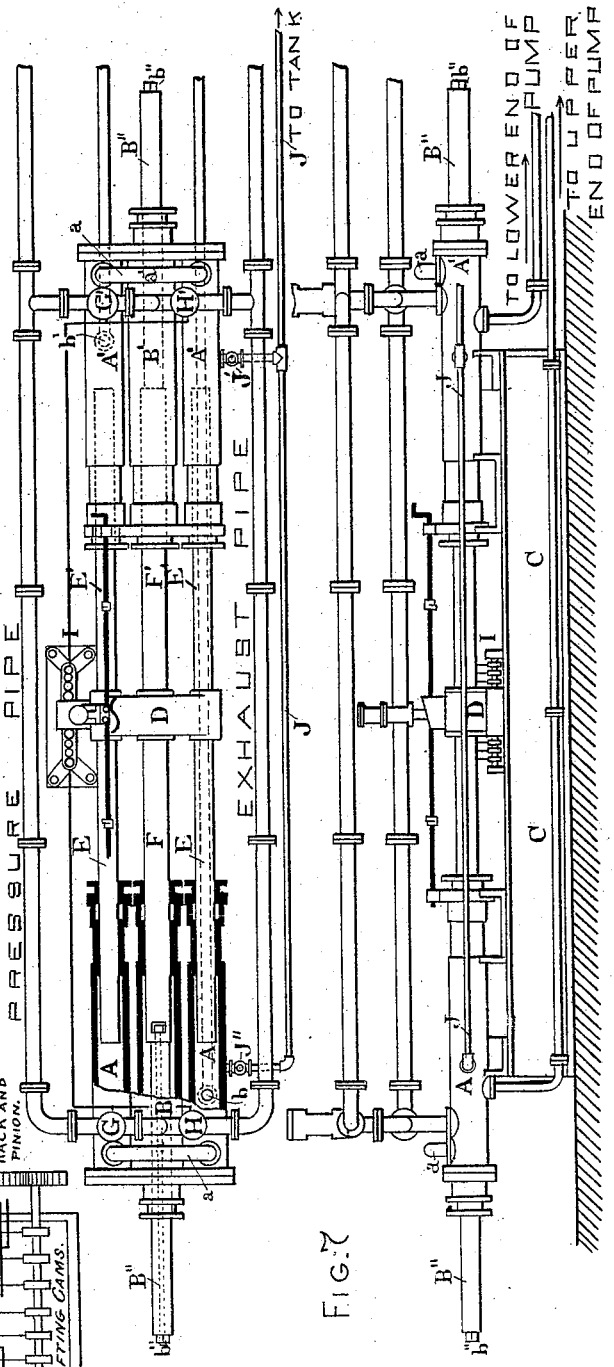
WITNESSES
Thomas Barclay
A. B. Bowers
INVENTOR
George W. Dickie
by George Hardy, Atty

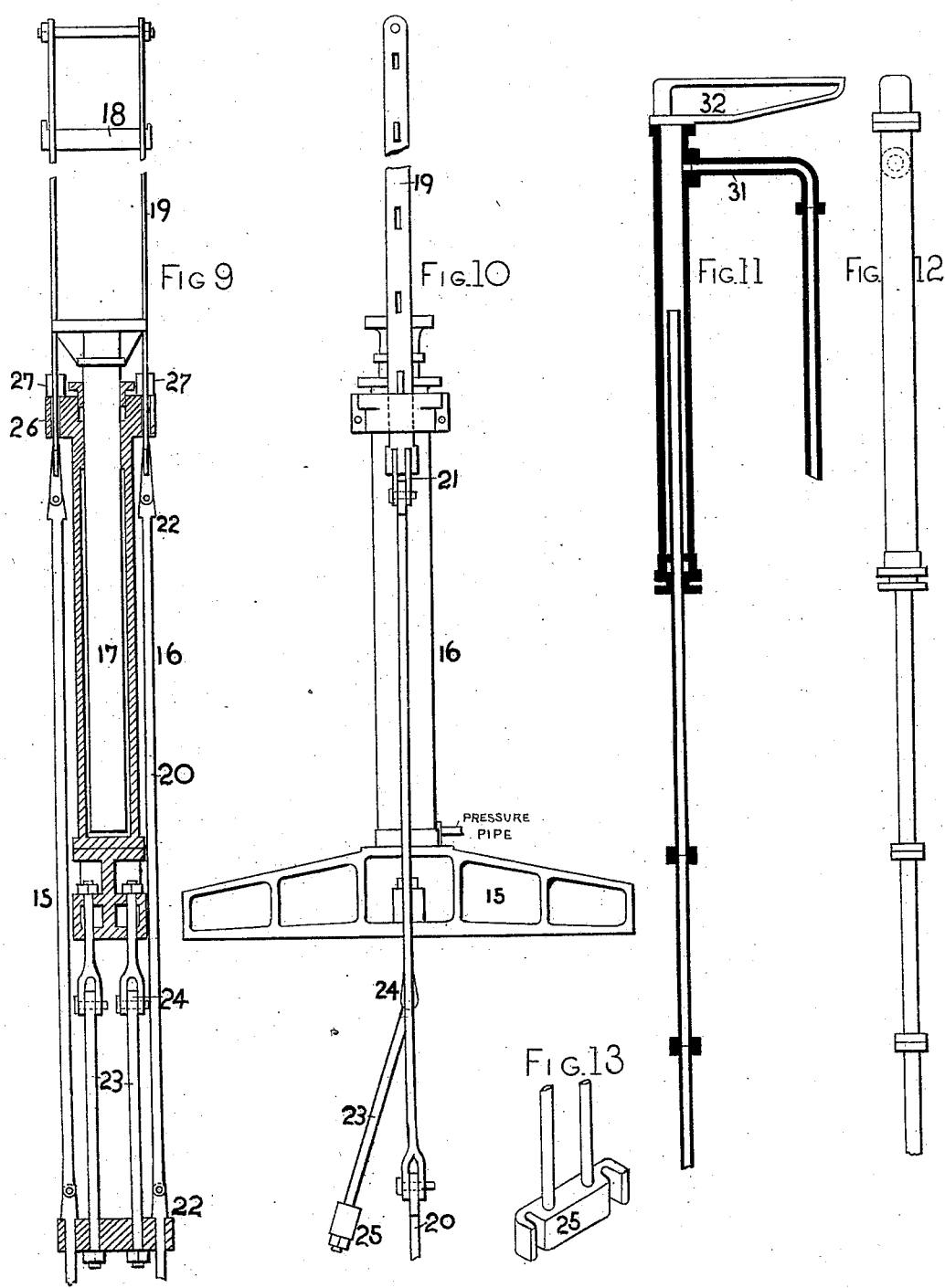

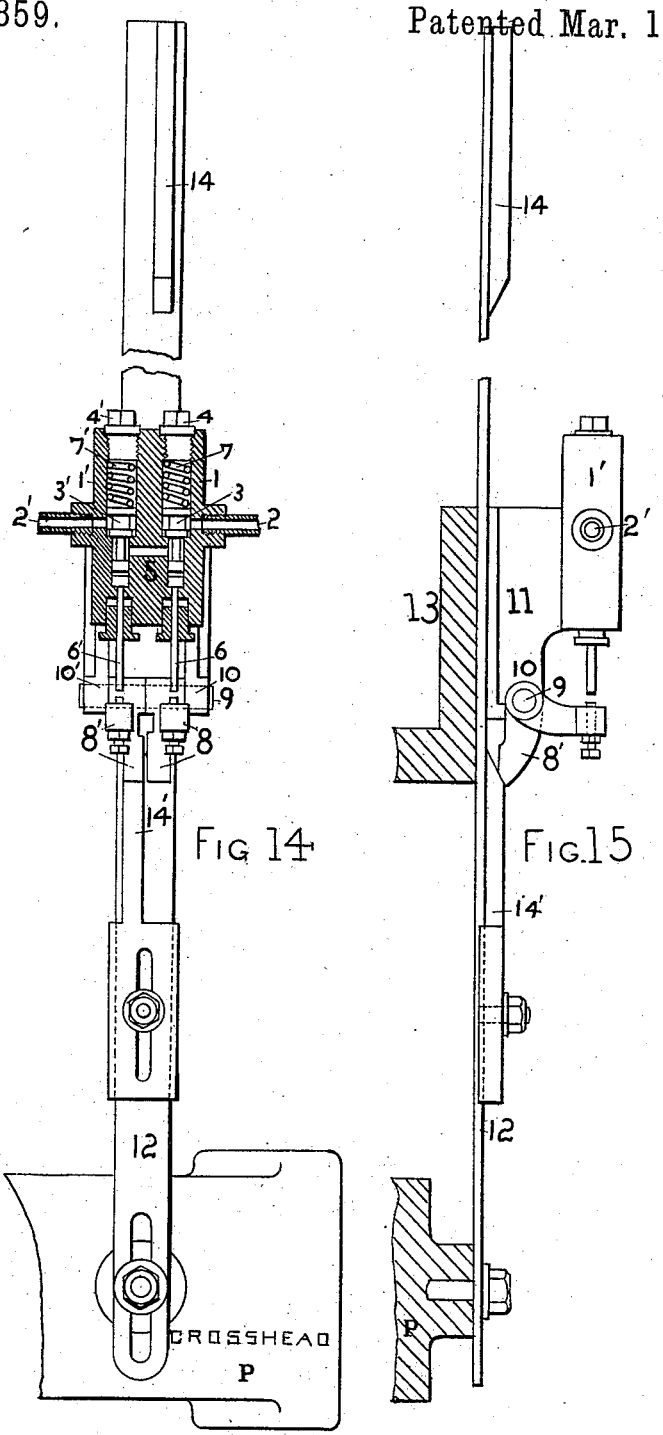

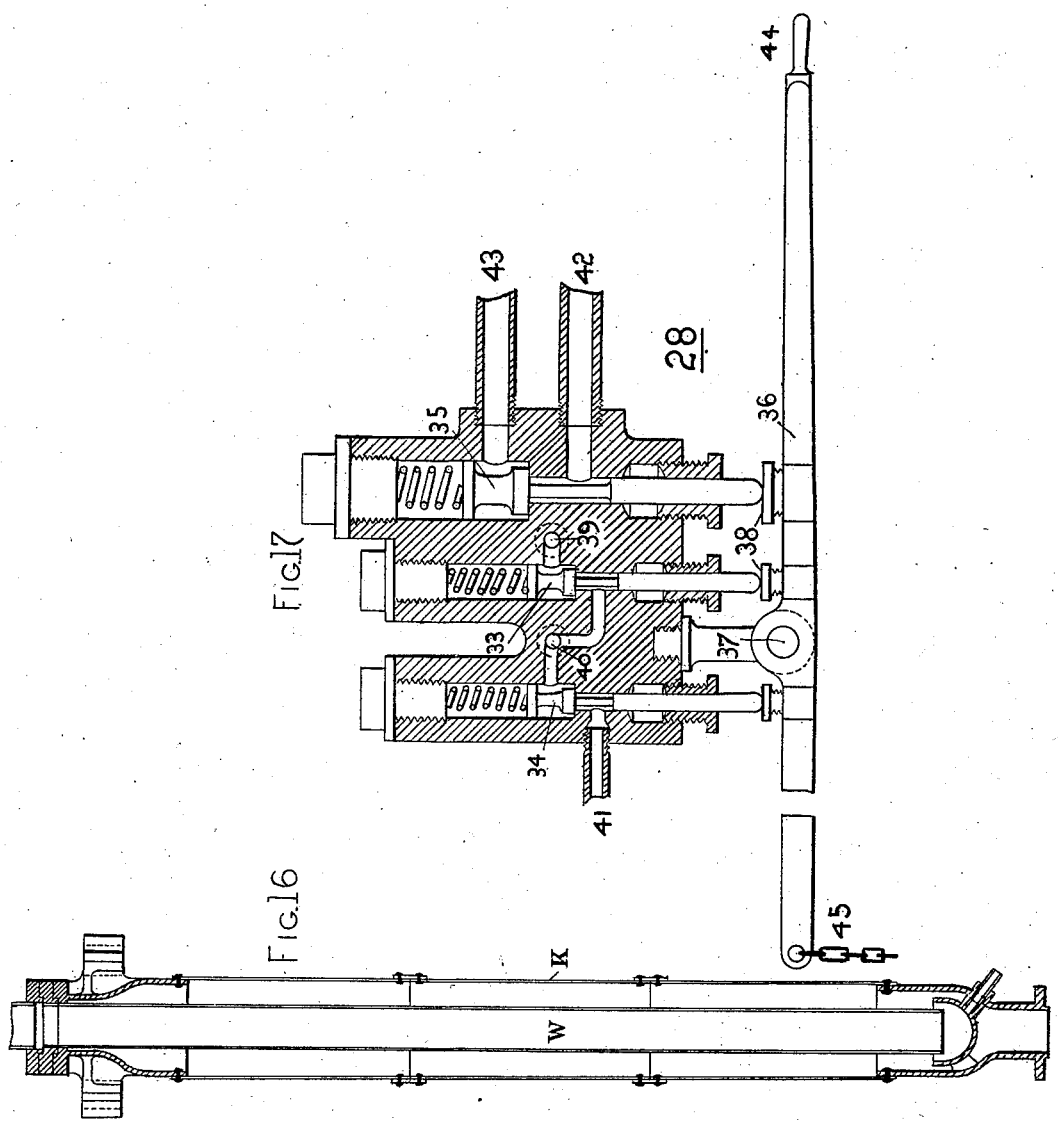

UNITED STATES PATENT OFFICE.

GEORGE W. DICKIE, OF SAN FRANCISCO, CALIFORNIA, ASSIGNOR TO THE RISDON IRON AND LOCOMOTIVE WORKS, OF SAME PLACE.

APPARATUS FOR DRAINING MINES.

SPECIFICATION forming part of Letters Patent No. 294,859, dated March 11, 1884.

Application filed December 23, 1882. (No model.)

*To all whom it may concern:*

Be it known that I, GEORGE W. DICKIE, a citizen of the United States, residing at San Francisco, State of California, have invented a new and Improved Apparatus for Draining Mines, of which the following is a specification.

My invention relates generally to mine-draining machinery, and especially to such machinery as is employed in mines which are being constantly increased in depth; and it consists in certain combinations of parts, described in detail in the specification, and specifically pointed out in the claims.

The object of my invention is to lessen the cost of machinery for the purpose intended; to avoid much of the liability to derangement from accident, wear, or tear; to economize the power expended, and thus increase its effective capacity, and generally to improve the facilities for operating the whole and the parts in detail.

The invention may be otherwise adapted than as herein stated, as to the whole or any of its parts, for analogous uses.

In the accompanying six sheets of drawings the figures are consecutively numbered.

On Sheet 1, Figure 1 is a sectional elevation of a mining-shaft at and about the station where my hydraulic engine or actuating-rams operate. Fig. 1$^A$ is a continuing part of the same view at and near the sump or bottom of the shaft, showing my sinking-pump in position and its pipe-connections with the parts above. These figures illustrate my invention in gross;
but to make it more thoroughly understood, I have drawn the various elemental parts to a larger scale upon separate sheets.

On Sheet 2, illustrating my sinking-pump, Fig. 2 is a longitudinal sectional elevation taken through both pump and side-ram cylinders. Fig. 3 is a similar elevation, but taken crosswise of the previous view through one of the two pairs of side-ram cyliders. Fig. 4 is an exterior elevation, looking from in front and viewing all the ram-cylinders with the pump between. Fig. 5 is a diagrammatic plan, showing more clearly the cross connecting-pipes for each pair of ram-cylinders, and also the side guides.

Sheet 3 illustrates my hydraulic engine or actuating-rams, Fig. 6 being a plan of same, partly in section; Fig. 7, a side elevation, and Fig. 8 an end view. Fig. 8½ is a diagrammatic elevation of the main valve-operating mechanism, which, for clearness of illustration, does not follow the precise relative positions of the parts as in actual construction.

Sheet 4 illustrates my hydraulic lift and lowerer for the pump and the parts therewith related, Fig. 9 being a cross-sectional elevation of the ram-cylinder, with ram and lifting rods in place; Fig. 10, an exterior elevation, viewed from a point facing the supporting-beam; Figs. 11 and 12, sectional and exterior elevations, respectively, of the sliding joint for pressure-pipes of pump. Fig. 13 is an isometrical view of chock-block used in connection with the hanging rods of pump.

Sheet 5 illustrates the safety equalizing-valves to regulate the stroke of pump, Fig. 14 being a front elevation of the valves and their operating parts, the valves being in section; Fig. 15, an edge or side view of the same.

Sheet 6 illustrates the pump, air-chamber, and valves for hydraulic lift, Fig. 16 being a broken sectional elevation of the air-chamber, and Fig. 17 a sectional elevation of the valves.

In all the figures similar letters and numbers refer to similar parts.

*General description.*—This apparatus is primarily actuated by a supply of water under pressure, the pressure being due either to the elevation of the source or the action of a pressure-engine of any suitable kind. Having first arranged for this water-pressure, the particular manner of producing which, it will be understood, is no part of this invention, it is made to operate what may be called an "actuating-engine"—an engine set generally at a station near the bottom of the shaft of the mine. This actuating-engine consists of six cylinders in two sets of three each, one set being secured upon each end of a horizontal frame opposing the other set. The middle cylinders of each set receive the water under pressure, alternating with the corresponding cylinder of the other set. As they are supplied and exhausted alternately, the rams which enter them are forced forward and backward to carry with them a cross-head, to the ends of which, two projecting forward and the other two backward, are attached four smaller plungers or rams, which enter into the side cylinders of each of the opposing sets of three. The force with which these side rams are pushed into their respective cylinders by the water-pressure acting upon the end areas of the middle rams will represent the amount of power which will be transmitted through the connecting-pipes to the pump below. This pump, which I call my "sinking-pump," like the actuating-engine, has six cylinders similarly arranged as before, but standing vertically or upon an incline, to correspond with the shaft of the mine. The water under pressure to move it comes alternately from the back and forward pair of side cylinders of the actuating-engine through pipes, which have long sliding joints to permit the lifting and lowering of the pump. The pump has a hollow differential plunger, with a discharge-valve opening upward within its interior, and a similar suction-valve below the point to which the plunger recedes. The part of the plunger working in the lower cylinder is just twice the area of the part working in the upper cylinder, the water passing up through the center of both into the vertical discharge-pipe, which forms a direct continuation of this water-conduit. As the plungers rise a quantity of water equal to the full area of the upper plunger multiplied by its stroke is displaced in and thrown out of the discharge-pipe, and a quantity of water equal to the area of the lower plunger multiplied by its stroke is permitted to enter the lower cylinder by suction. Reversing the stroke, as the plungers fall, a quantity of water equal to the area multiplied by the stroke of the lower plunger is displaced in the lower cylinder and forced up through both plungers into the discharge-pipe; but inasmuch as the receding of the upper plunger at the same time takes place, but half the volume of this water is thrown out of the discharge-pipe, the other half being necessary to take the place vacated by the receding upper plunger. Thus, while the pump has a continuous and unvarying discharge, it receives its supply by suction only on its upstroke. The discharge-pipe empties into a tank at the same level with the actuating-engine, and it is from this tank the other stationary pumps of the mine, if there be any, take their supply. There is placed upon a cross-beam at the proper place in the shaft of the mine, above the station where the actuating-engine is located, a hydraulic lifting and lowering jack. This is simply a ram working in a cylinder, into which the available pressure from the pipes leading to the actuating-engine is admitted to lift the ram, and with it to pull up certain side suspensory rods, which are fastened to the pump below. This ram is controlled and operated by suitable valves at the station where the actuator is placed. The actuating-engine is used as an intermediate between the original power and the pump, because it is impracticable to apply the pressure direct, as the mechanism for reversing the stroke could not well be attached to a pump working at the bottom of a mine. The valves and the valve-gear are all on the actuating-engine, the pump itself having no other valves than those within its interior, the pipes connecting between the pump and the actuator being also without valves. Besides, as the pump sinks lower in the mine and a greater power is necessary to elevate the water, no arrangement could be effected for adjusting the proportion between the power applied and the effective work done so well as results from the employment of the actuating-engine, which may be adjusted to the work in hand, as will be shown further on.

*The actuating-engine.*—In the drawings, in Fig. 1, the actuating-engine is shown in an underground chamber, the water from the sump being raised only to this level to be raised higher by any suitable means. The action, however, would be the same if the engine were placed on top of the shaft and no other pumping system were employed. In the Figs. 6, 7, 8, and 8½, Sheet 3, all the parts which are necessary to describe are shown. In Fig. 6, A B A are three cylinders cast side by side together, and bolted on one end of a frame, C. A' B' A' are three other cylinders of the same kind, bolted on the other end facing the first set, with a space between to accommodate the travel of the cross-head D. From this cross-head there are projected three plungers, E F E, into the cylinders A B A, and three others, E' F' E', into the cylinders A' B' A', all the cylinders having stuffing-box heads and glands. The cylinders A A are connected with each other by the pipe $a$, and the cylinders A' A' by the pipe $a'$, thus making the exit-holes $b\ b'$ common to the pair of cylinders with which they connect. The middle cylinders, B B', are alternately connected, through a peculiar valve system, with a high-pressure column of water, the opposing cylinder at the time being relieved therefrom. The pressure, being thus applied upon the ends of the center plungers, is transmitted through the side plungers to give a corresponding pressure to the water filling the side cylinders opposite. The combined areas of each two side plungers being equal to the area of the opposite middle plunger, the pressure transmitted will be the same, though any pressure can be given by varying the proportions between side and middle plungers. If it is desired to give more pressure from one end of the engine than from the other—so as, for instance, to provide for the lifting of a heavy vertical pump-plunger at one stroke, which in falling on the return-stroke gives back the power expended in lifting it—the matter must be considered in calculating the proper areas of the various plungers. It is not absolutely necessary, however, in this respect that any particular accuracy of proportion should be maintained. G G' are the main pressure-supply valves, and H H' are the exhaust or pressure-relief valves, the opening and closing of which are effected by the opening and closing of certain small valves with which each is connected. These small valves are shown in a row of eight at I, a black line showing the connecting-pipes. A general understanding of this valve system may be given here, though for precise details my other application must be referred to. All the valves G G' H and H' are alike, and are common in effect with ordinary automatic check-valves, though a peculiar shape and arrangement are given in this instance. All have a tendency to lift from a pressure below, and are only kept closed by a superior pressure above. This superior pressure above is obtained from the same pressure-column by giving the valve more area on top than underneath. A small pipe, coming from the nest of eight valves at I, leads into the chamber above each valve, and if this small pipe is connected with the pressure column the valve will for this reason be kept firmly closed; but if the pipe, on the contrary, is connected with an open escape-pipe, and any pressure at all is below the valve, then it will immediately open. Now, it is the office of the nest of eight valves at I to connect or switch these small pipes above named alternately to the pressure-column and the open discharge, to effect at the end of every stroke the opening or closing of each of the main valves. These main valves must be opened or closed, as it may be, consecutively, as follows: First, shut the pressure-valve on the end, then finishing its stroke; second, close the opposite end exhaust-valve; third, open the remaining exhaust-valve; fourth, open the remaining pressure-valve to commence the next stroke. Of course all these movements could not be obtained if the motion to open and close the valves were the motion of the rams direct, for they instantaneously stop and do not move a hair's breadth between the closing of one pressure-valve and the opening of the other. Therefore it is necessary that some auxiliary mechanism should be employed to operate these small valves, which, though operated primarily by the motion of the rams, is afterward capable of moving independent thereof. This auxiliary mechanism is the same as I have described in a previous application; but for convenience I will give, in general terms, a short account of it here. There is a short horizontal shaft directly under the nest of eight valves at I. On this shaft are eight sudden-trip cams. As the shaft turns, the cams are made so as to suddenly lift each valve-stem and keep it lifted till the proper time comes for dropping it. All the cams are alike as to throw and duration of lift. The shaft is turned slowly by a rack-gear, engaging with a pinion, which is secured to the middle of it in practice; but for clearness I have put it on the end in the diagram Fig. 8½, the rack-gear being a continuation of or an attachment to a rod carrying a piston, which works in a closed vertical cylinder above. To raise and lower the rack, and thus turn the cams to the right or to the left, water-pressure is admitted above or below the piston. This is effected by opening or closing certain valves or cocks, which alternately connect the pressure-column with the bottom or top of the cylinder, of course simultaneously exhausting the opposite end. These last valves are suddenly tripped to open and close when the cross-head D, upon which a twisted trip-cam is secured, arrives at the end of its stroke, for then this trip-cam engages a little projecting knob secured on a rod, which is set parallel with the main rams, and turns the rod partly around, which act, through intermediate mechanism, operates upon these valves. There must be a regulation of speed of travel of the engine, and this is accomplished by a regulation of the speed of the valve-movement, which is adjusted within limits by opening or closing two cocks, which control the amount of water admitted into the piston-cylinder. There is a small leakage liable to occur in this engine from imperfect joints. This escaped water is resupplied in the side-ram cylinders by a pipe, J, with ordinary check-valves at J' J'', which lead from the tank into which the pump discharges, the resupply occuring on the stroke when the high pressure is removed from the respective cylinders. There is not always needed the same amount of power from the engine, for at first the pumping is but from a slight depth, and later it may be from a very great depth, as the mine is deepened. This matter is provided for by attaching to the ends of the middle rams supplemental reducing-sleeves B'' B'', which pass through stuffing-box heads at the back end of each middle cylinder. These sleeves reduce the effective areas of the main rams and economize the expenditure of power. There should be about three sizes, and the stuffing-boxes must be fitted with removable bushings, to accommodate the different sizes used. They must tightly butt against and be very firmly secured to the main rams by a bolt passing longitudinally through the end of the main ram and the entire length of the reducing-sleeve. The nut of these bolts is shown at b''. Strong tie-rods should be used to connect between the faces of the side cylinders, for simply bolting to the frame C may not give sufficient security. In the figures of the drawings the different pipes are properly identified as to their functions, and further mention thereof is not necessary here. At the back end of each side cylinder there is provided a rubber-spring buffer, c, to receive the ram in case it should overrun its proper stroke, as in Figs. 2 and 3.

*Sinking-pump.*—This is fully illustrated on Sheet 2, to which alone I will refer under this head. L M L are three cylinders, cast side by side together, which, when in use, stand vertically above three other cylinders, L' M' L', a proper distance below. Stout pillars or tie-rods N connect the two sets together, in conjunction with the irons forming the side guides, O, which are continuous irons fastened to both the sides. All the cylinders have stuffing-box heads at the ends which face each other. A cross-head, P, is the common connection between the six plungers Q R Q and Q' R' Q', which plungers enter, respectively, the upper and lower cylinders. The side plungers are forced up and down by the pressure of water coming from the actuating-engine above, transmitting their action through the cross-head to the middle plungers, which form part of the pumping device. The pipes conveying water under pressure from the actuating-engine connect with only one side cylinder above and one below, cross-pipes S S carrying the pressure to the other side cylinder of each pair. When the high pressure comes through one pipe, the other has only a pressure due to its distance below the actuating-engine—a pressure which need not be regarded, for both pipes are always balanced in this respect. There is no water supplied or consumed between the actuating-engine and the pump beyond the original charge in the pipes and cylinders, saving that there may be a little leakage, heretofore referred to, which must be resupplied. The pump-plunger R R' is in two parts, the lower part, R', having the cross-head cast upon it and the upper part, R, being fitted into it, as clearly indicated in the drawings. The part where the joint is made must be well fitted and secured from leakage. The outside area of the lower plunger ought to be double that of the upper plunger, though great accuracy of proportion is not required. T is a common disk-valve, with a rubber facing, properly guided by a round center stem working in a slotted hole in the concave bottom of the upper plunger, a knob on top of this stem being provided, so that when the upper plunger is lifted out for examination or repair the valve will be drawn up with it. The slotted hole for the stem is cut through to the outside of the plunger, and an open place is provided in the side of the plunger to pass the knob of the stem through, so that when the valve is to be removed it can be drawn out sidewise on the line of the plane of its face. The seat for this valve is cast with the larger plunger, as shown. There is an annular space between the interior and exterior of the two plungers, where they are telescoped one into the other, sufficient to give free passage to the discharging water, which passes into the center of the plunger through the openings r in the side of the upper plunger. Of these openings there may be three or four. U is the suction-valve, also opening upward, similar in form to the valve T, but having no stem. It must therefore be guided to maintain its central position by wings cast at the side of the barrel, and to prevent its lifting too high a bracket projects over it, which is cast on the inside of a cover, d, which closes an opening through which this valve is introduced to its place. The suction-strainer or wind-bore V is clearly shown, and needs no elaborate description. The pump is guided to be lifted and lowered plumb by being held between stout side posts fastened to the timbers of the mine, the posts being inclasped by the double angle or channel irons O. W is the discharge-column, which leads to the tank through a sliding joint, hereinafter to be described in detail. This pump may be said to have no valves excepting the suction and discharge valves; but inasmuch as its stroke is reversed by the operation of the actuating-engine, it may be considered that the engine and pump are but two ends of the same machine. There is a possibility that the time of the pump—that is to say, the instant of its arrival at the end of a stroke—may vary from that of the actuating-engine. If this is not provided against, the pump-rams might, continuing their travel, strike the cylinder-heads and cause damage. To avoid this difficulty there are provided twin valves X, which so operate as that when the pump reaches the end of its stroke, and without reference to the action of the actuating-engine, one or other of the twin valves is tripped open, accordingly as it may be upon the up or the down stroke, and a communication opened between the upper and lower cylinders and pipes connecting between. These twin valves will be further described in detail under a separate head. The pump is suspended from hanging-rods, but when at work it may rest on the bottom of the shaft of the mine. The pump has a peculiar air-chamber and an apparatus to lift and lower it, to a description of which a separate head will be devoted, because as these details are drawn on separate sheets it will be more convenient to do so. The operation of the pump is briefly suggested before. (See general description.)

*Equalizing-valves for pump.*—On Sheet 5 the details of these twin valves and their operating mechanism is shown. 1 1' are twin cylinders having annular valve-seats at just below where the pipes 2 2' enter. 3 3' are the valves. These are simply small lengths of a rod turned at the top, so as to loosely fill the cylinder; then below turned so much less to form a valve-disk and to give room for the water to pass between its rim and the side of the cylinder; then turned to form a lifting-stem still smaller than the inside diameter of the valve-seat, and at the bottom turned exactly the same diameter as the inside of the valve-seat and cylinder in which it plays up and down. From the valve-seats up, the cylinders are bored a trifle larger than the outer diameter of the valves, and a screw-thread is cut at the top to receive the plugs 4 4'. Below the valve-seats there is a communicating-passage, 5, between the cylinders, and from above the valve-seats the pipe 2 leads directly into one of the upper side cylinders of the pump, the pipe 2' leading indirectly to the lower side cylinders through the pressure-pipe, which is near by. Directly under these twin valves are the lifting-stems 6 6', which are simply straight rods passing down through a stuffing-box and gland at the bottom of the cylinders, to project an inch or so below. A head or collar at top of these stems about fills the chamber of the valve-stems, being made a little larger than the hole the stem passes through. There are spiral springs 7 7' interposed between the bottom of the plugs and the top of the valves, to insure their being seated when there is no pressure below. 8 8' are bell-cranks, swinging independently of each other on a cross-shaft, 9, which is supported in bearings 10 10', cast on the same bracket, 11, which carries the valve-cylinders. One limb of each bell-crank stands horizontally and terminates with a boss, through which a set-screw passes to stand plumb under the stem of each valve. The other limb of each bell-crank stands vertically, and has a beveled point to correspond with the wedges which operate them. There is a long flat bar, 12, which is guided in a recess between the back face of the bracket 11 and the flange 13, which is cast on one of the upper side cylinders of the pump. The lower end of this bar is attached by a stud-bolt to the cross-head of the pump, and the exact point of attachment may be varied or adjusted within a few inches; the hole in the bar to receive the bolt being a slotted one. On this bar are two tripping-wedges, 14 14'—one at the top, at the right-hand edge, firmly riveted thereto, and the other near the bottom at the left-hand edge, this latter being made with a base a little wider than the bar itself, with overlapping edges to act as guides to keep it plumb. A long slotted hole is on the vertical center line of this base-plate, and a stud passes through it into the bar, with a nut to be tightened when securing the trip-wedge in position. The points of the upper and lower trip-wedges are beveled off at about the same angle as the limbs of the bell-cranks. These trip-wedges are so placed on the bar in relation to the stroke of the pump and the position of the bell-cranks as to effect the tripping or opening of the valves just at the instant the end of the stroke is completed, the upper wedge acting on the down-stroke and the lower wedge acting on the up-stroke. The vertical limbs of the bell-cranks being pushed out, when, by the motion of the cross-head, the wedges make contact with them, and the horizontal limbs being thereupon raised up, the set-screws impinge upon the valve-stems and the valves are raised.
When either one of the two valves is lifted to admit the pressure from above it through to under the adjoining valve, this latter valve is lifted and the pressure passes through the pipe to the opposite end of the pump, and all motion immediately ceases. Afterward, as soon as the pressure is released from one pipe and thrown on the other by the action of the engine above, then the last-opened valve closes, and the wedge which opened the first valve traveling back again, the other valve closes, too. Of course it may be that the pump and engine shall work so accurately together as not to bring these valves into operation. They are simply used for precautionary purposes.

*The air-vessel.*—On sheet 6, Fig. 16, the air-chamber K is illustrated. This is simply an inclosed envelope surrounding the discharge-pipe, commencing immediately above the pump and extending from fifteen to twenty feet up the pipe. The top and bottom of this vessel are formed of cast-iron chambers, to which the plate iron pipe envelope is riveted. The bottom chamber carries a bowl in its center, supported from the sides by brackets. Into this the main discharge-pipe dips about three inches, ample room being given around and between the edge of the discharge-pipe and the inside of the bowl for the water to pass. The chamber under the bowl narrows to the diameter of the discharge-pipe. The discharge-pipe, after passing through the contracted mouth of the upper chamber, rests its joint-flanges thereon, and is bolted to a flange provided to receive it. Just below this point there are provided clamp-boxes with caps to bolt thereon. These receive the pressure-pipes and hold them an exact distance apart, so that they may be in alignment with the sliding joints above. The joints of the plates of the envelope should be made by butting the edges together and riveting a hoop outside over the joint, for these joints have to take the whole weight of the pipe, and it would not do to depend on rivets alone. In taking water from the sump, much air is received into the pump. This will be separated at the rim of the bowl, the air passing up into the enveloped space around the pipe, and the water passing on through the discharge-pipe in the middle. A cock or valve may be provided on the outer chamber to blow off when the accumulation of air is above a desired point. A discharge pipe and cock may also be used to periodically lead off any sedimentary accumulations from the bottom of the bowl.

*Hydraulic lift and telescopic joint.*—Sheet 4 exhibits this element of the system in detail, though a general idea can be obtained from Fig. 1. Across the shaft of the mine there is a strong girder, 15, of wood or iron. To this is bolted an upright cylinder, 16, closed at the bottom, and having a stuffing-box and gland at the top. In this cylinder is the ram 17, which in rising, when a water-pressure is introduced into the cylinder at the bottom, carries with it the cross-key 18, which rests on its head. This key enters any of the opposite slotted holes in the side straps, 19, and, as it is raised, carries the straps with it. To these side straps hanging rods 20 are attached by suitable link-joints, as shown, 21, these rods being joined in lengths of eight or ten feet by a fork on the lower end of the rod slipping over a flattened end on the top of the rod it joins with, a pin being passed through both. At the upper end of each rod there must be a shoulder—such as is shown at 22—strong enough to carry the whole weight of the pump. From the girder direct there depend two swinging rods, 23, having each a forked joint at 24, with pin passing through, as shown. The lower ends of these swinging rods carry a stout cross-bar, 25, having notches at each end, as shown, to receive and fit around the hanging rods under the shoulders. When these bars are swung under the shoulders, the rods above, which join onto the straps, may be removed, as the pump will then hang from the girder direct. Then, if the pump is to be further raised, the plunger is permitted to fall to its lowest point by releasing the pressure, and the straps being then in a position to be joined with the next rods, a new lift may be made. The straps pass through slots in heavy lugs cast on the top of the cylinder, as at 26. To provide for the hanging of the pump at points between those to be attained by adding or removing lengths of rods, I pass short keys, 27, through any of the slots in the straps; and when these keys rest on top of the lugs they will support the pump and column below. When this is done, the swinging rods before named will be out of service.

The pipe which supplies the water under pressure to the cylinder is alternately connected with the high-pressure column and the balance-column or the open tank by a valve or valves, 28, of any suitable pattern. (See Fig. 1, Sheet 1.) Two common globe-valves and branch pipes will serve the purpose, one being closed when the other is open. A special valve I describe further on. (See Fig. 17, Sheet 6.)

*Sliding joints.*—When the pump is raised and lowered, the pressure-pipes leading from the actuating-engine to pump and the pump-discharge pipe must rise and lower with it, as before suggested. The arrangement for the discharge-pipe is simply to provide a branch elbow, 29, Fig. 1, to the mouth of which a few feet of canvas hose is fastened. This hose (or iron pipe will do) telescopes into a wooden or iron conduit, Y, Fig. 1, which discharges into the tank Z. To accommodate the pressure-pipes there is a girder, 30, Fig. 1, across the shaft, from underneath which two long sleeve-pipes, Figs. 11 and 12, are suspended—one for each pipe—having a stuffing-box and gland at bottom. The pipes telescope into these sleeves. At the top end there is the elbow 31, to which the pipe is connected, leading from the actuating-engine. The long brackets 32, from which the sleeves depend, shield the elbows below from being struck by any matter falling down the shaft, which is a constant danger in mining; also, they serve to permit the sleeves to be suspended a distance out from the girder, which cannot be directly over the sleeves, owing to other pipes being in the way.

*Valves for hydraulic jack.*—On Sheet 6, Fig. 17, I give a sectional elevation of my triple valve, which is to operate the lifting-jack. The two valves 33 34 are the smaller, and operate to supply and exhaust the cylinder of the jack. The valve 35 is larger, and this (there may be two side by side, if preferred) connects between the two pipes leading from the actuating-engine to the pump. 36 is a lever, which has its fulcrum at 37, on which the stems of the different valves rest, adjusting-screws 38 passing through the lever under the stems, to adjust the contact. The valves and the shell containing them are the same as I have before described, and illustrated on Sheet 5, excepting that the stems may be solid with the valves and not separated into two parts, as before. The hole at 39 opens into a pipe leading to the high-pressure column, the hole 40 to jack-cylinder, the hole 41 to balance column or tank, the hole 42 to the tank, and the hole 43 to the pipes connecting between the actuating-engines and the pumps. When the valve 33 is lifted by throwing up the handle 44 or pulling down the chain 45, the water-pressure passes through to lift the ram, and at the same time the valve 35 will be lifted to open a passage to let the surplus water escape from the pipes connecting between the actuating-engine and the pump, which surplus is forced out in consequence of the pipes telescoping into the sleeves before mentioned. When the valve 34 is raised by the reverse action of the lever, a passage to the balance column or tank is opened from the cylinder of the ram. Valves 33 and 35 will then drop to their seats, and, the ram falling, the pump will be lowered.

It is manifest that although the pump and actuating-engine are herein described as having a certain number of rams each, it would be quite feasible to arrange for a greater or less number—as, for instance, a very good pump might be made with a ram on one side only of the pump-ram, instead of one on both sides; or three or four, or even more, might be used. This is a matter of choice.

What I claim as my invention, and desire to secure by Letters Patent, is as follows:

1. A pumping apparatus consisting of a combination of an actuating-engine moved by water-pressure, and having valves and valve-operating mechanism to effect a reciprocating motion therein, and a pump to which said motion is directly transmitted through pipes filled with water, as and for the purpose described.

2. In a pumping apparatus having a vertically-acting pump, the combination, with the said pump, of an actuating-engine moved by water-pressure, having separate cylinders and plungers to generate the pressure to supply each end of said pump, and in which separate cylinders different pressures may be produced to act alternately through leading pipes to effect the up-and-down stroke of the pump, substantially as and for the purpose described.

3. An actuating-engine consisting of a combination of a set of rams alternately moving backward and forward within their respective cylinders through the action of water-pressure controlled by suitable valves and valve-operating mechanism, and a second set of similar rams connected with the first set by a crosshead, which, operating in their respective cylinders, generate a power, which is transmitted through leading pipes filled with water for the purpose, substantially as herein described.

4. The pump consisting of the differential plunger, with the discharge and suction valves, all operating within suitable cylinders, in combination with side rams operated within their respective cylinders by water-pressure applied thereto, and transmitting their motion to said differential plunger by being connected therewith, substantially as herein described.

5. In combination with a pump used for sinking purposes in a mine, a hydraulic lifting-jack consisting of a ram operating in a cylinder, which ram in raising carries up with it suspensory rods, to which the pump is attached, substantially as and for the purpose herein described.

6. In combination with a pump used for sinking purposes in a mine, and a hydraulic lifting-jack operating to raise and lower the same, the suspensory rods herein described, consisting of the side straps, 19, having the slotted holes therein, with cross-key 18, rods 20, having shoulders 22, swinging rods 23, hanging from girder 15, and cross-bars 25, arranged and operated substantially as described, and for the purpose set forth.

7. As a means of raising and lowering a hydraulic sinking-pump in a mine, the combination of a lifting-jack permanently located in the shaft above said pump, and from which it is suitably suspended, and telescopic joints for the pressure-supply pipes and discharge-column, substantially as herein described.

8. In combination with a hydraulic pump operated by an actuating-engine having coincident duration of stroke, a safety device, substantially as herein described, consisting of valves, which are opened by suitable mechanism to give free communication between each end of said pump to the effect of equalizing the pressure therein to arrest further motion upon completion of the stroke.

9. In combination with a hydraulic pump, the specific combination of parts constituting the above safety device, consisting of the flat bar 12, with wedges 14 14' thereon, bell-cranks 8 8', suitably supported, twin valves 3 3' in their respective cylinders 1 1', and connecting-pipes, arranged and operated substantially as herein described.

10. The air-chamber, Fig. 16, consisting of a combination, with the vertical discharge-pipe of the pump, of the envelope surrounding the same and the bowl into which the end of the discharge-pipe dips, substantially as and for the purpose described.

11. The triple valves shown in Fig. 17, consisting of a combination of the valves 33 and 34, opening and closing passages between the cylinder of the lifting-jack and the pressure and balance column, respectively, the valve 35, opening and closing a passage from the telescopic pipes, Figs. 11 and 12, to the open air, and the operating-lever 36, substantially as and for the purpose described.

12. In combination with a sinking-pump for mines, having sliding frame in which it is periodically lifted and lowered, the telescoping leading and discharge pipes and the actuating-engine, substantially as herein described.

GEORGE W. DICKIE.

Witnesses:
GEORGE PARDY,
SAML. F. BIRDSALL.